United States Patent [19]

Harrow

[11] 4,229,126
[45] Oct. 21, 1980

[54] MACHINES FOR TAPPING NUTS

[75] Inventor: George A. Harrow, Swansea, Wales

[73] Assignee: Westlane Industries, Inc., Dearborn Heights, Mich.

[21] Appl. No.: 938,888

[22] Filed: Sep. 1, 1978

[30] Foreign Application Priority Data

May 24, 1977 [GB] United Kingdom ............... 21744/77
Aug. 11, 1978 [GB] United Kingdom ............... 33142/78

[51] Int. Cl.² ........................... B23G 1/18; B23Q 5/26
[52] U.S. Cl. ........................... 408/63; 10/139 WH; 10/139 WJ
[58] Field of Search ... 10/129 WH, 129 WJ, 130 WH, 10/139 WH, 139 WJ; 408/62, 63

[56] References Cited

U.S. PATENT DOCUMENTS 3,197,792  8/1965  Haefling ........................... 408/62
4,064,585  12/1977  Loos ........................... 408/63 X

FOREIGN PATENT DOCUMENTS 609954  10/1948  United Kingdom ............... 10/139 WH
857774   1/1961  United Kingdom ............... 10/139 WH
1010435 11/1965  United Kingdom ............... 10/139 WJ
1018476  1/1966  United Kingdom ............... 10/129 WJ Primary Examiner—Ervin M. Combs
Attorney, Agent, or Firm—Whittemore, Hulbert & Belknap

[57] ABSTRACT

A nut tapper comprises a pusher for pushing blanks onto a rotating tap. The pusher is urged towards the tap by a pneumatic piston and cylinder unit and the speed of approach of the pusher towards the tap is limited by a cam and follower mechanism. The pressure in the piston and cylinder unit can be adjusted to vary the force exerted on a blank by the pusher. The piston and cylinder unit and the cam and follower mechanism are disposed together below the pusher and tap.

4 Claims, 1 Drawing Figure

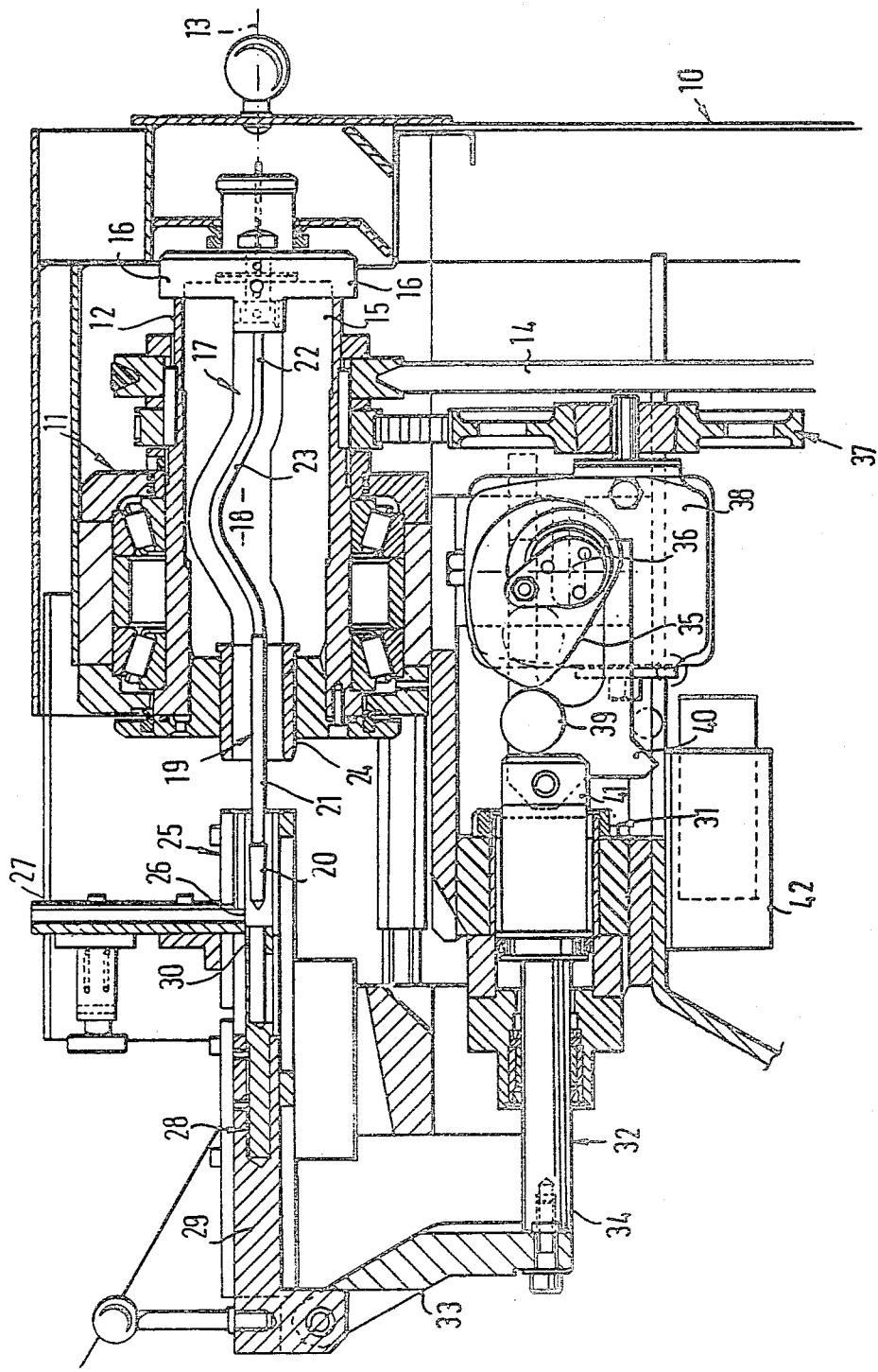

MACHINES FOR TAPPING NUTS

DESCRIPTION OF INVENTION

This invention relates to a machine for cutting an internal screw thread in a nut and comprising a carrier for a tap, feed means for feeding nut blanks successively onto the tap and a motor for causing relative rotation of the carrier and nut blanks, the feed means including a reciprocable pusher which is engageable with the nut blanks and is operative to push the blanks towards a leading end of the tap along a feed path aligned with such leading end. For convenience, such a machine is hereinafter referred to as a "nut tapper".

The feed means of nut tappers commonly in use at the pesent time include a screw and nut mechanism or a cam and follower mechanism for reciprocating the pusher positively to push successive nuts onto the tap. The screw and nut mechanism or cam and follower mechanism is normally driven from the motor which causes relative rotation of the tap and nut blanks, so that the rate of advance of a blank onto the tap is related to the speed of relative rotation by the pitch of the thread which is to be formed in the blank. In the event of there being excessively high resistance to movement of a blank onto the tap, for example in a case where the blank does not have a properly formed aperture, positive operation of the feed means usually results in breakage of the tap.

One object of a first aspect of the invention concerns the reduction of the risk of breakage of the tap or a part of the nut tapper occurring when an improperly formed blank is fed up to the tap.

A further object of the first aspect of the invention concerns improved control of the conditions under which the thread is formed in the nut blank. In practice, it is impossible to maintain these conditions exactly uniform during a long production run. One cause of changing conditions is the wear of tools used to produce the apertured nut blanks. For example, it is usually found that the size of the aperture varies slightly during a long production run in which the same tools are employed throughout the run. If all other conditions of the tapping operation were to be maintained constant, such variations in the size of the aperture of the blanks would result in variations in the finished nuts to such an extent that some of the nuts produced fall outside the tolerance limits applicable to the particular production run. By suitable control of the conditions under which the tapping operation is carried out, the effect of variations in the size of the aperture in the blanks on the finished nuts can be minimized. Nevertheless, difficulty arises in determining the change in one parameter which should be made to compensate for a change occurring in another parameter.

For example, if there is a change in the diameter of the aperture of nut blanks during a long production run, the effect of this on the finished thread can be ameliorated by changing the force applied to each blank to move the blank on to the tap. It is necessary to establish by trial and error the change required in the force to minimize or eliminate variations in the threads of the finished nuts.

It is a further object of the first aspect of the invention to provide feed means which facilitates control of the force applied to each blank to move such blank onto the tap.

According to the first aspect of the invention, there is provided a nut tapper wherein the feed means comprises a fluidactuated piston and cylinder unit associated with the pusher for applying to the pusher the force which the pusher exerts on the blanks to push same onto the tap.

With this arrangement, the force applied by the pusher to the blanks is limited to a value corresponding to the pressure in the position and cylinder unit. The limiting value of this force can readily be varied by varying the pressure in the piston and cylinder unit.

At least during an initial stage of engagement of the tap with a blank, there is a fairly high resistance to the movement of the blank along the tap and the force applied by the pusher to the blank will generally equal the limiting value determined by the pressure in the piston and cylinder unit. Accordingly, an operator can exercise control over the force applied by the pusher to the blank by controlling the pressure in the piston and cylinder unit. There is preferably associated with the piston and cylinder unit settable means for adjusting the pressure therein to a selected value.

Preferably, there is further provided a cam and follower mechanism for limiting the speed of approach of the pusher towards the tap to a speed determined by the cam and follower mechanism, the pusher being free to approach at a speed lower than the limiting speed.

With this arrangement, during normal operation the piston and cylinder unit maintains the speed of approach of a blank towards the tap at the maximum value permitted by the cam and follower mechanism. Thus, by use of an appropriate cam, the speed of advance of each blank can be controlled in accordance with the speed of relative rotation and the pitch of the thread of the tap.

The piston and cylinder unit is preferably a single acting unit, the pusher being moved in a direction away from the tap by the cam and follower mechanism.

According to a second aspect of the invention, there is provided a nut tapper wherein the feed means includes resilient biasing means for urging the pusher along the feed path towards a leading end of the tap, a cam and follower mechanism for limiting the speed at which the pusher is caused to approach said leading end, both the biasing means and the cam and follower mechanism being offset from the feed path, and an arm extending transversely of the feed path, the pusher being connected with the arm adjacent to one end of the arm and both the biasing means and the cam and follower mechanism being connected with the arm adjacent to its opposite end.

The invention will now be described, by way of example, with reference to the accompanying drawing which shows certain parts of a nut tapper in accordance with the invention, some of these parts being shown in cross section .

The nut tapper comprises a body 10, only a small part of which is shown in the drawing and which rests on a floor surface. On the body there is secured a bearing 11 which supports a hollow spindle 12 for rotation about a horizontal axis 13. The bearing restrains the spindle against axial displacement relative to the body. An electric motor (not shown) for rotating the spindle is connected with the spindle by a belt and pulley drive 14.

A generally cylindrical carrier 15 is a sliding fit in the spindle 12. The carrier is formed with integral keys 16 which project radially from the carrier into slots formed in a rear end portion of the spindle. Engagement between these keys and ends of the slots limits forward movement of the carrier relative to the spindle. Means (not shown) is provided for releasably retaining the carrier in the spindle. Such means may comprise one or more spring loaded balls mounted in the carrier to seat in hemi-spherical recesses formed in the spindle. Additionally a radially extending lock pin may be provided. The carrier can readily be withdrawn from the spindle by grasping a rear end portion of the carrier and exerting a sufficient force in the rearward axial direction to release the carrier after the lock pin, if provided, has been withdrawn.

The carrier 15 is formed with an internal passageway 17 which extends through the carrier from one end to the other. Opposite end portions of the passageway 17 are circular and coaxial with the spindle 12. An intermediate portion 18 of the passageway has an elongate cross section with a radially outer boundary which is curved, as shown in the drawing, and diverges from the axis 13 to one side thereof and then returns towards the axis. The boundaries of the passageway 17 are smoothly curved and there are no abrupt corners such as might obstruct the movement of nuts through the passageway. The larger cross section of the intermediate portion 18 provides a clearance which further reduces the risk of nuts jamming in the passageway.

For convenience, the carrier is formed in two parts which engage each other in a plane containing the axis 13. One only of these parts is shown in the drawing.

In the carrier 15 there is mounted a tap which comprises a shank 19 and a threaded portion 20 at a leading end of the shank. The shank includes a leading rectilinear portion 21 and a trailing portion 22, both of which are co-axial with the threaded portion 20. An intermediate portion 23 of the tap is off-set to one side of the axis of the leading and trailing portions, this intermediate portion being curved and united with the leading and trailing portions by smooth curves.

When the nut tapper is in use, the shank 19 of the tap extends through a row of nuts (not shown) which support the tap and are in turn supported by the carrier 15. During operation of the nut tapper, the nuts are moved along the tap from the threaded portion 20 to the trailing portion 22 and are subsequently discharged from the rear end of the passageway 17. The diameter of the leading portion 21 of the tap shank is such that this portion is a sliding fit within the nuts. The nuts are in turn a sliding fit within a guide portion 24 of the spindle 15 so that the leading portion of the tap shank is held in co-axial relation with the spindle. The intermediate portion 23 and the trailing portion 22 of the tap shank have a somewhat smaller diameter, so that nuts can slide freely along these portions of the tap, notwithstanding that the nuts are required to negotiate the curves of the intermediate portion.

The threaded portion 20 of the tap is disposed within an elongate nut guide 25 which is stationarily mounted on the body 10. The nut guide defines a rectilinear internal passageway having a cross section corresponding to the shape of the profile of the nuts, so that nut blanks fed to the guide are guided for movement along a rectilinear path centered on the axis 13 and are constrained against rotation. An aperture 26 is formed in an upper part of the nut guide at a position spaced somewhat forwardly from the tip of the threaded portion 20 of the tap to admit nut blanks to the guide 25 from a chute 27.

The chute 27 forms a part of feed means for feeding nut blanks onto the tap. The feed means includes a pusher 28 for engaging nut blanks and pushing same from a position directly below the chute 27 along the nut guide 25 onto the threaded portion 20 of the tap. A first part 29 of the pusher co-operates with a guideway provided on the body 10 for guiding the pusher along a rectilinear path parallel to the axis 13. A second part, 30 of the pusher has a cross section similar to that of the nut blanks and extends into the nut guide 25 to engage the nut blanks.

The feed means further includes resilient biasing means for urging the pusher 28 in a direction towards the tap. The biasing means is in the form of a pneumatic piston and cylinder unit 31, the cylinder of which is secured on the body 10 in a position offset downwardly from the feed path along which the pusher 28 moves. The axis of the unit 31 is parallel to but offset from the axis 13. Opposite end portions of a piston rod 32 of the unit 31 protrude from corresponding ends of the cylinder. The piston rod is connected with the pusher 28 by an arm 33 which extends transversely of the feed path. The arm is pivotally connected adjacent to its upper end with an end portion of the pusher remote from the tap. An end portion 34 of the piston rod which extends from the cylinder in a direction away from the tap is rigidly secured to the arm adjacent to a lower end thereof. The arm constrains the pusher 28 to reciprocate with the piston rod 32.

The piston and cylinder unit 31 is single acting and is provided with adjustable control means of known construction (not shown) for controlling the pressure of the fluid within the unit. The control means maintains a selected pressure in the cylinder and this pressure can be varied throughout a predetermined range by means of a suitably positioned control knob. A pressure indicator may be provided to indicate the pressure subsisting in the piston and cylinder unit. Whilst a pneumatic unit is preferred, the cylinder may be charged with liquid from an accumulator.

For controlling movement of the pusher 28 in a direction towards the tap, there is provided a cam and follower mechanism which is driven in co-ordination with rotation of the spindle 12. This mechanism comprises a cam 35 mounted on the body 10 for rotation about a fixed axis 36. A toothed belt drive 37 and gear box 38 are provided for transmitting drive from the spindle 12 to the cam. The periphery of the cam is engaged by a follower in the form of a roller 39 which is mounted on a fork 40 extending on either side of the cam to maintain the roller in proper alignment with the cam.

The fork 40 is guided on the body 10 for reciprocation along a path parallel to the axis 13 and substantially aligned with the piston rod 32. The fork is secured to a second end portion 41 of the piston rod remote from the end portion 34.

To facilitate movement of the fork 40 in a direction towards the arm 33 by the action of the cam 35 on the roller 39, the roller is positioned at a level somewhat above the level of the axis 36. Thus, the axis of the roller 39 and the entire roller itself lie above a line parallel to the axis 13 and intersecting the axis 36 of the cam. As can be seen from the drawing, this line passes through the piston and cylinder unit 31.

We have found that the positioning of the piston and cylinder unit 31 substantially in alignment (in a direction parallel to the axis 13) with the cam and follower mechanism 35, 39 provides a nut tapper which is more reliable than is a similar nut tapper having the piston and cylinder unit in alignment with the pusher. This, notwithstanding that the pusher is advanced towards the tap by the piston and cylinder unit.

At the beginning of each cycle of operation, the pusher 28 is withdrawn by the cam and follower mechanism 35, 39 sufficiently far from the tap to permit a nut blank to fall through the aperture 26 into the guide 25. The pusher is then advanced towards the tap by the piston and cylinder unit 31. The pusher blocks the aperture 26 and advances until the blank has moved along the entire length of the threaded portion 20 of the tap. The pusher is then withdrawn from the tap once more. The pressure which is maintained in the unit 31 normally maintains the roller 39 in contact with the periphery of the cam 35. Accordingly, the speed of reciprocation of the pusher is determined by the profile of the cam. This profile is selected to establish a speed of advance of each nut blank along the threaded portion 20 of the tap which is coordinated with the speed of rotation of the tap and the pitch of the thread of the tap.

Torque is transmitted to the intermediate portion 23 of the tap shank from the carrier 15 via the units which are engaged with the curved intermediate portion of the shank. These nuts also restrain the tap against axial movement relative to the carrier.

During advance of the pusher, an abutment which is mounted on the fork 40 actuates a limit switch 42 to provide a signal indicating proper movement of the pusher. This limit switch provides an output signal which de-activates a timing device. In the absence of such output signal the timing device interrupts operation of the nut tapper after a predetermined delay commencing when the pusher begins to advance a nut blank towards the tap. In the event of a blank without a central aperture being pushed towards the tap, continued movement of the blank and pusher will be obstructed and the pressure maintained in the unit 31 will be insufficient to maintain the roller 39 in contact with the cam 35. The limit switch will not be actuated and the timing device will interrupt operation of the nut tapper at the end of the predetermined delay. The pressure maintained in the unit 31 is insufficient to cause breakage of the tap so that when the improperly formed blank has been cleared from the nut tapper, normal operation can be resumed.

To protect the machine in the event of movement of the pusher in a direction away from the tap being obstructed drive may be transmitted to the cam through a pin which is adapted to shear if there is an unusually high resistance to rotation of the cam.

I claim:

1. A nut tapping machine comprising a rotary tap, a reciprocating pusher in line with said tap, means for feeding a nut to a position between and in line with said tap and pusher, a fluid actuated piston and cylinder unit, said piston having one end connected to said pusher, a rotary cam driven in synchronization with said tap, a cam follower carried by said piston and engaging said cam, said piston acting under fluid pressure supplied thereto in a direction to cause said pusher to advance toward said tap to force a nut onto and along said tap while said cam follower engages said cam whereby to limit the speed of movement of the pusher toward the tap to a speed determined by the profile of the cam.

2. A nut tapping machine according to claim 1, wherein said piston and cylinder unit is disposed on an axis parallel to and offset from the axis of said pusher and said tap.

3. A nut tapping machine accordingly to claim 2, wherein said piston and cylinder unit is a single acting unit, said cam acting through said cam follower to effect return movement of said piston and said pusher.

4. A nut tapping machine according to claim 3, including an arm extending transversely between said one end of said piston and said pusher and secured thereto, said cam follower being secured to the other end of said piston.

* * * * *